United States Patent
Agardh (10) Patent No.: US 11,419,081 B2
(45) Date of Patent: Aug. 16, 2022

(54) METHOD AND APPARATUS FOR ANCHOR CHANNEL CONTROL

(71) Applicant: SONY CORPORATION, Tokyo (JP)

(72) Inventor: Kåre Agardh, Lund (SE)

(73) Assignee: Sony Group Corporation, Tokyo (JP)

( * ) Notice: Subject to any disclaimer, the term of this patent is extended or adjusted under 35 U.S.C. 154(b) by 250 days.

(21) Appl. No.: 16/634,056

(22) PCT Filed: Jun. 26, 2018

(86) PCT No.: PCT/US2018/039478
§ 371 (c)(1),
(2) Date: Jan. 24, 2020

(87) PCT Pub. No.: WO2019/060015
PCT Pub. Date: Mar. 28, 2019

(65) Prior Publication Data
US 2020/0169977 A1    May 28, 2020

(30) Foreign Application Priority Data

Sep. 21, 2017 (SE) .................................. 1730258-9

(51) Int. Cl.
*H04W 24/08* (2009.01)
*H04W 56/00* (2009.01)
*H04W 16/14* (2009.01)

(52) U.S. Cl.
CPC ....... *H04W 56/0015* (2013.01); *H04W 16/14* (2013.01); *H04W 24/08* (2013.01)

(58) Field of Classification Search
CPC .. H04W 56/0015; H04W 16/14; H04W 24/08
See application file for complete search history.

(56) References Cited

U.S. PATENT DOCUMENTS

2009/0257380 A1* 10/2009 Meier ................. H04W 72/082
                                                         370/329
2010/0202354 A1*  8/2010 Ho ......................... G06Q 10/06
                                                         370/328
(Continued)

FOREIGN PATENT DOCUMENTS

CN       101981966 A      2/2011
CN       103907388 A      7/2014
(Continued)

OTHER PUBLICATIONS

Office Action and Swedish Search Report from corresponding Swedish Application No. 1730258-9, dated Jun. 7, 2018, 5 pages.
(Continued)

*Primary Examiner* — Hassan Kizou
*Assistant Examiner* — Hector Reyes
(74) *Attorney, Agent, or Firm* — Tucker Ellis LLP (57) ABSTRACT

Controlling synchronization signal operation in a base station operating in shared spectrum includes detecting a condition related to a current anchor channel configuration used for transmission of synchronization signal transmissions and selecting, based on the detecting, a new anchor channel configuration and communicating the new anchor channel configuration to electronic devices serviced by the base station. The base station commences sending a predetermined number of synchronization signal transmissions using the current anchor channel configuration; and one of: i) sends synchronization signal transmissions using the new anchor channel configuration if the predetermined number of synchronization signal transmissions are sent on the current anchor channel configuration; or ii) aborts a change to the new anchor channel configuration if feedback is received from one of the electronic devices that the electronic device detected interference on the new anchor chan-
(Continued)

nel configuration before the predetermined number of synchronization signal transmissions are sent.

16 Claims, 4 Drawing Sheets

(56) References Cited

U.S. PATENT DOCUMENTS

| | | |
|---|---|---|
| 2011/0026481 A1 | 2/2011 | Takamatsu |
| 2011/0069684 A1* | 3/2011 | Jeon .................. H04W 72/0406 |
| | | 370/336 |
| 2012/0115468 A1* | 5/2012 | Lindoff .................. H04W 36/06 |
| | | 455/434 |
| 2013/0077554 A1* | 3/2013 | Gauvreau ......... H04W 72/0453 |
| | | 370/312 |
| 2015/0012971 A1* | 1/2015 | Ram .................. H04W 12/122 |
| | | 726/3 |
| 2017/0223561 A1 | 8/2017 | Radulescu et al. |
| 2017/0230933 A1 | 8/2017 | Radulescu et al. |
| 2018/0132149 A1 | 5/2018 | Zhao et al. |

FOREIGN PATENT DOCUMENTS

| | | |
|---|---|---|
| CN | 106385697 A | 2/2017 |
| EP | 2966904 A1 | 1/2016 |
| WO | 2017016167 A1 | 2/2017 |
| WO | 2017196249 A1 | 11/2017 |

OTHER PUBLICATIONS

Bhausaheb E. Shinde et al.: "LTE-LAA and Wi-Fi Coexistence on 5 GHz—A Survey", International Journal of Management, Technology And Engineering; IEEE Communications Surveys & Tutorials; Feb. 22, 2017.

International Search Report and Written Opinion from corresponding Application No. PCT/US2018/039478, dated Sep. 28, 2018, 15 pages.

\* cited by examiner

METHOD AND APPARATUS FOR ANCHOR CHANNEL CONTROL

RELATED APPLICATION DATA

This applications claims the benefit of Swedish Patent Application No. 1730258-9, filed Sep. 21, 2017, the disclosure of which is incorporated herein by reference in its entirety.

TECHNICAL FIELD OF THE INVENTION

The technology of the present disclosure relates generally to wireless communications among electronic devices in a network environment and, more particularly, to a method and apparatus for coordinating use of an anchor channel over which synchronization signal transmissions are made.

BACKGROUND

The use of wireless spectrum for radio communications is increasing. To support wireless applications, ways to use more spectrum bands have been sought. For example, spectrum sharing is thought of as one of the most viable ways of improving the amount of spectrum available to wireless networks for conducting wireless communications. Spectrum sharing may occur in unlicensed spectrum bands (also referred to as licensed-exempt spectrum bands) or in other spectrum that a government authority (e.g., the FCC in the U.S.) has designated for sharing, such as citizens broadband radio service (CBRS) spectrum (e.g., the FCC 3.5 GHz band). One proposal to facilitate spectrum sharing is to adapt existing 3GPP standards to operate in shared radio spectrum. One such attempt is referred to as MulteFire proposed by the MulteFire Alliance. Various adaptations to the 3GPP standards may include adding listen-before-talk (LBT), changing physical numerology such as bandwidth, changing channel allocations, etc.

Another adaptation is to create anchor channels, which are channels at predetermined static frequencies on which control and synchronization data is transmitted by a base station to electronic devices serviced by the base station in order to maintain the network. Anchor channel design will depend on spectrum availability, for example in the 2.4 GHz to 2.83 GHz unlicensed band there may be about three anchor channels, for example at 2400 MHz, 2432 MHz and 2483 MHz. Synchronization data, such as primary synchronization signals (PSS) and secondary synchronization signals (SSS), may be sent on the anchor channel at fixed intervals so as to have a predetermined periodicity. The remaining spectrum may be channelized and used for other control signaling and bulk data.

An anchor channel configuration is selected by the base station and communicated to the electronic devices serviced by the base station. The anchor channel configuration includes the anchor channel frequency and the timing of the synchronization signal transmissions. Synchronization signal transmissions are sent approximately every 80 milliseconds (ms) in MulteFire networks and are sent approximately every 100 ms in Wi-Fi networks, but synchronization signal transmission at other periodicities are possible. The base station may attempt to offset its synchronization signal transmissions from the synchronization signal transmissions of another network by shifting the times at which the synchronization signal transmissions are made.

The base station may change the anchor channel configuration to accommodate unpredicted changes in the environment that arise due to the nature of shared spectrum (e.g., the arrival of a different network using the same anchor channel with the same or similar synchronization signal transmission periodicity or interference from another source). Changing the anchor channel configuration may include one or both of changing the anchor channel to another frequency or adding an offset to the time at which synchronization signal transmissions have been sent. But changing the anchor channel configuration for a network during active wireless communications may be problematic. For instance, interference that is undetectable by the base station on a proposed anchor channel configuration may be present at the location of one or more of the electronic devices serviced by the base station.

SUMMARY

The disclosed approach alerts electronic devices serviced by a base station to impending changes in anchor channel configuration. The base station may provide a "countdown" to the occurrence of the change through a series of synchronization signal transmissions. During the countdown, the electronic devices may scan the proposed anchor channel configuration for interference or other conditions and, if a potentially problematic condition is detected, provide feedback to the base station. The change may be aborted and the countdown may terminate if negative feedback from one or more of the base stations is received. Termination of the countdown indicates to the electronic devices that the prior proposed change in anchor channel configuration will not occur. If the countdown reaches its end, the proposed changes will go into effect at the next synchronization signal transmission. This approach results in a coordinated approach to changing anchor channel configuration that takes into account the spectrum environment for all devices in the network. Therefore, changes to synchronization signal transmission that will hinder wireless communications may be avoided.

According to one aspect of the disclosure, a method of controlling synchronization signal operation in a base station operating in shared spectrum includes detecting a condition related to a current anchor channel configuration used for transmission of synchronization signal transmissions; selecting, based on the detecting, a new anchor channel configuration and communicating the new anchor channel configuration to electronic devices serviced by the base station; commencing sending a predetermined number of synchronization signal transmissions using the current anchor channel configuration; and one of: i) sending synchronization signal transmissions using the new anchor channel configuration if the predetermined number of synchronization signal transmissions are sent on the current anchor channel configuration; or ii) aborting a change to the new anchor channel configuration if feedback is received from one of the electronic devices that the electronic device detected interference on the new anchor channel configuration.

According to one embodiment of the method, the condition is interference.

According to one embodiment of the method, the predetermined number of synchronization signal transmissions is tracked with a counter of the number of transmitted synchronization signal transmissions.

According to one embodiment of the method, the method also includes including counter values in corresponding synchronization signal transmissions as a reference to the electronic devices as to when the synchronization signal transmissions will be transmitted on the new anchor channel configuration.

According to one embodiment of the method, the new anchor channel configuration has a different anchor channel frequency than the current anchor channel configuration.

According to one embodiment of the method, the new anchor channel configuration has a different timing of synchronization signal transmission than the current anchor channel configuration.

According to another aspect of the disclosure, a base station that operates in shared spectrum includes a wireless interface over which wireless communications with electronic devices are carried out; and a control circuit configured to control synchronization signal operation by the base station, including: detect a condition related to a current anchor channel configuration used for transmission of synchronization signal transmissions; select, based on the detection, a new anchor channel configuration and communicate the new anchor channel configuration to electronic devices serviced by the base station; commence sending a predetermined number of synchronization signal transmissions using the current anchor channel configuration; and one of: i) send synchronization signal transmissions using the new anchor channel configuration if the predetermined number of synchronization signal transmissions are sent on the current anchor channel configuration; or ii) abort a change to the new anchor channel configuration if feedback is received from one of the electronic devices that the electronic device detected interference on the new anchor channel configuration.

According to one embodiment of the base station, the condition is interference.

According to one embodiment of the base station, the predetermined number of synchronization signal transmissions is tracked with a counter of the number of transmitted synchronization signal transmissions.

According to one embodiment of the base station, counter values are included in corresponding synchronization signal transmissions as a reference to the electronic devices as to when the synchronization signal transmissions will be transmitted on the new anchor channel configuration.

According to one embodiment of the base station, the new anchor channel configuration has a different anchor channel frequency than the current anchor channel configuration.

According to one embodiment of the base station, the new anchor channel configuration has a different timing of synchronization signal transmission than the current anchor channel configuration.

According to another aspect of the disclosure, a method of controlling synchronization signal transmission handling in an electronic device operating in shared spectrum and serviced by a base station includes receiving notification indicative of a new anchor channel configuration from the base station; evaluating the new anchor channel configuration for a condition related to the new anchor channel configuration; upon the condition being detected, transmitting feedback to the base station regarding the detected interference; and following the receipt of the notification of the new anchor channel configuration and, if a time arrives to switch from a current anchor channel configuration to the new anchor channel configuration, switching from current anchor channel configuration to the new anchor channel configuration.

According to one embodiment of the method, the condition is interference.

According to one embodiment of the method, the method also includes evaluating the detected interference for potential to disrupt receipt of synchronization signal transmissions on the new anchor channel configuration.

According to one embodiment of the method, determining if a time arrives to switch from the current anchor channel configuration to the new anchor channel configuration includes monitoring a value in received synchronization signal transmissions to determine if the monitored value reaches a predetermined value.

According to one embodiment of the method, the monitored value is a counter reflecting the number of synchronization signal transmissions sent since the notification of the new anchor channel configuration.

According to one embodiment of the method, the new anchor channel configuration has a different anchor channel frequency than the current anchor channel configuration.

According to one embodiment of the method, the new anchor channel configuration has a different timing of synchronization signal transmission than the current anchor channel configuration.

DETAILED DESCRIPTION OF EMBODIMENTS

Introduction

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for conducting wireless radio communications that include anchor channel control. The anchor channel control may be carried out in an automated manner by the respective devices. The anchor channel control may improve spectrum utilization in shared spectrum where multiple networks are free to operate using overlapping spectrum.

System Architecture

Figure 1:
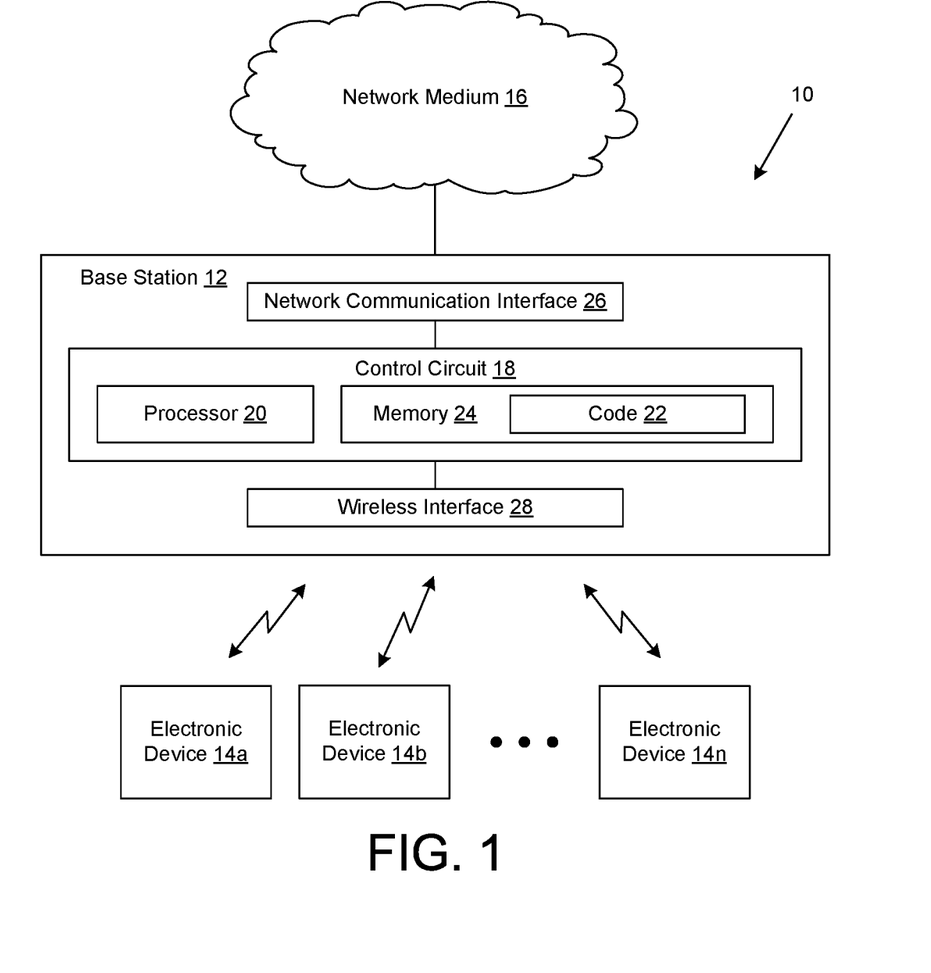
FIG. 1 is a schematic block diagram of a network system that conducts anchor channel control as part of wireless radio communications.

FIG. 1 is a schematic diagram of an exemplary network system 10 for implementing the disclosed techniques. It will be appreciated that the illustrated system is representative and other systems may be used to implement the disclosed techniques. The exemplary network system 10 includes a base station 12 that operates in accordance with a cellular protocol, such as a protocol promulgated by 3GPP, Multe-Fire, or another standard. The network system 10 may operate in accordance with alternative standards, such as Wi-Fi (e.g., IEEE 802.11).

In one embodiment, the network system 10 uses shared radio spectrum to carry out wireless communications. For ease of description, the shared spectrum used by the network system 10 will be described as unlicensed spectrum. But the described approaches are equally applicable to other forms of shared spectrum (e.g., unlicensed spectrum, license-exempt spectrum, CBRS bands, etc.). As part of the unlicensed radio spectrum band used by the network system 10, one or more anchor channels are designated. As an example, the network system may use one or more channels in the 2.4 GHz to 2.83 GHz unlicensed spectrum band for control signaling and bulk data transmission. Within this spectrum, anchor channels may be designed, such as at 2400 MHz, 2432 MHz and 2483 MHz. It will be understood that other shared or unlicensed spectrum may be used and/or the anchor channels may be at different frequencies.

The network system 10 of the illustrated example supports cellular-type protocols, which may include circuit-switched network technologies and/or packet-switched network technologies. The network system 10 includes a base station 12 that services one or more electronic devices 14, designated as electronic devices 14a through 14n in FIG. 1. The base station 12 may support communications between the electronic devices 14 and a network medium 16 through which the electronic devices 14 may communicate with other electronic devices 14, servers, devices on the Internet, etc. In other embodiments, the network system 10 supports other types of protocols (e.g., Wi-Fi) and the base station is implemented as an access point, such as a router.

The base station 12 may include operational components for carrying out the wireless communications, the anchor channel control described herein and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the network medium 16. Also, the base station 12 may have a wireless interface 28 over which wireless communications are conducted with the electronic devices 14, including the anchor channel control operations described herein. The wireless interface 28 may include a radio circuit having one or more radio frequency transceivers (also referred to as a modem), at least one antenna assembly, and any appropriate tuners, impedance matching circuits, and any other components needed for the various supported frequency bands and radio access technologies.

The electronic devices 14 serviced by the base station 12 may be user devices (also known as user equipment or UEs) or machine-type devices. Exemplary electronic devices 14 include, but are not limited to, mobile radiotelephones ("smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
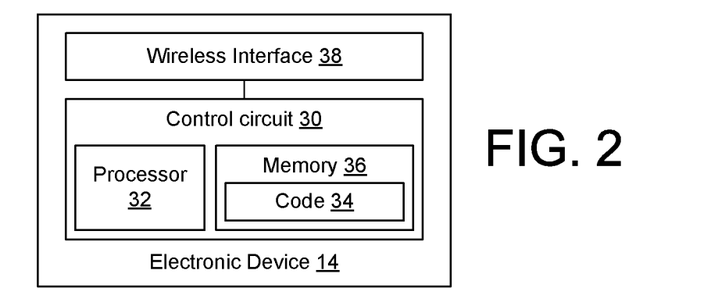
FIG. 2 is a schematic block diagram of an electronic device that forms part of the network system of FIG. 1.

Each electronic device 14 may include operational components for carrying out the wireless communications, the anchor channel control described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the anchor channel control operations described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

Wireless Radio Communications Involving Anchor Channel Control

Figure 3:
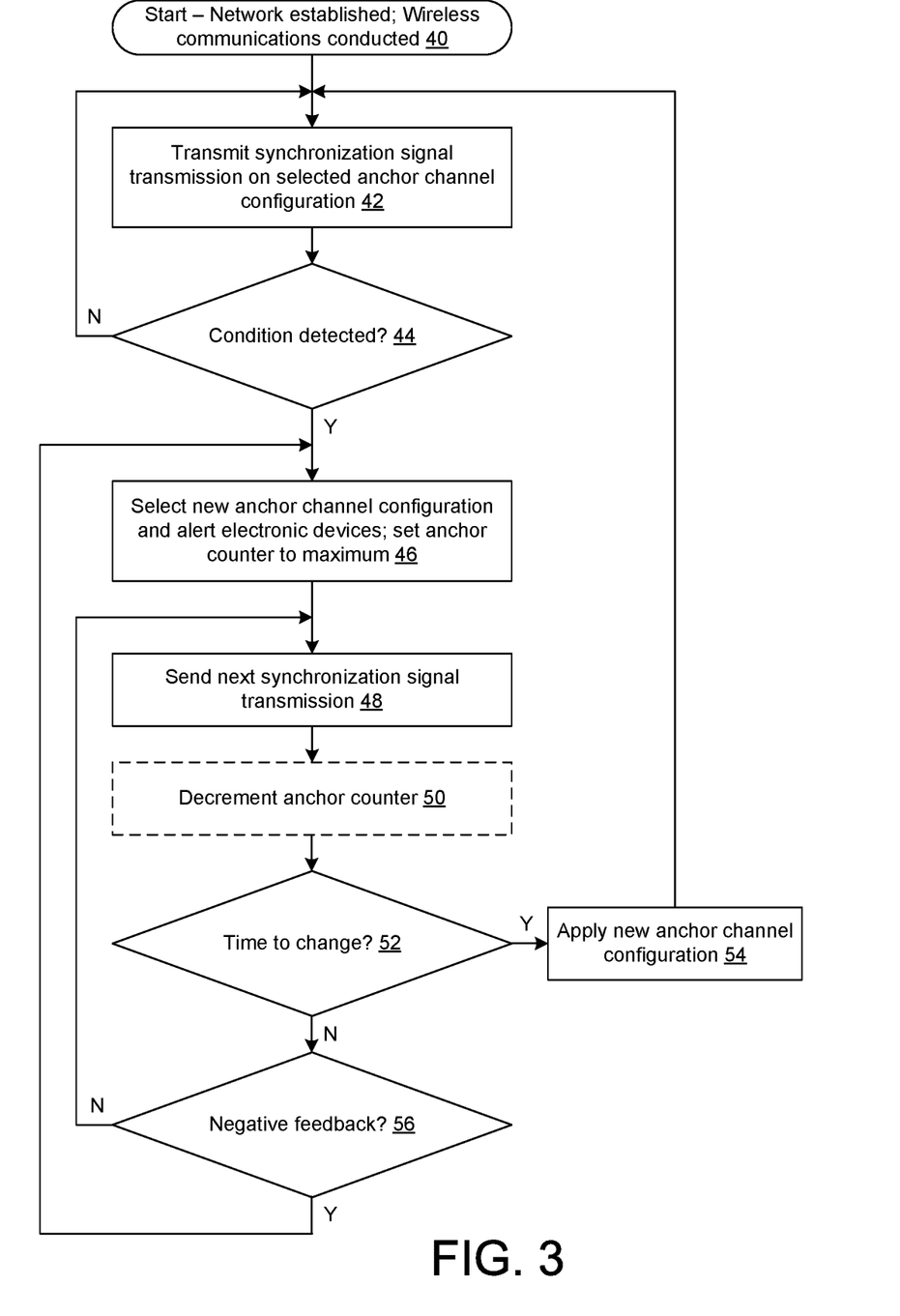
FIG. 3 is a flow-diagram of a representative method of conducting anchor channel control in a base station of the network system.

With additional reference to FIG. 3, shown is an exemplary flow diagram representing steps that may be carried out by the base station 12 when executing logical instructions to carry out anchor channel control for supporting certain wireless radio communications. Complimentary operations of the electronic device 14 are shown FIG. 4, which shows an exemplary flow diagram representing steps that may be carried out by the electronic device 14 when executing logical instructions to carry out anchor channel control for supporting certain wireless radio communications. Although illustrated in a logical progression, the blocks of FIGS. 3 and 4 may be carried out in other orders and/or with concurrence between two or more blocks. Therefore, the illustrated flow diagrams may be altered (including omitting steps) and/or may be implemented in an object-oriented manner or in a state-oriented manner. Also, the method represented by FIG. 3 may be carried out apart from the method of FIG. 4 and vice versa.

Referring to actions carried out by the base station 12, the logical flow of conducting anchor channel control may start in block 40. In block 40, it may be assumed that base station 12 is in operation such that a network has been established. Also wireless communications between the base station 12 and at least one electronic device 14 may be carried out. In block 42, as part of carrying out wireless communications, the base station 12 transmits a synchronization signal transmission on a selected anchor channel frequency and with appropriate timing. In a representative embodiment, the base station 12 may operate in accordance with MulteFire and transmit PSS and SSS signals with a periodicity of 80 ms, but other protocols and/or synchronization signal transmission timing are possible. A synchronization signal transmission may include one or more signals (e.g., PSS and SSS), one or more messages, one or more data packets, etc., depending on the implementation.

During operation, the base station 12 monitors the anchor channel configuration for a condition that would have a negative effect on synchronization signal operation or that may improve synchronization signal operation in block 44. Conditions that may be monitored include, but are not limited to, interference, RF propagation differences between channels (e.g., if switching to a new channel would result in improved performance), operation of a known signal source, etc. Interference may be the transmission of synchronization signal transmissions by another base station on the same anchor channel and with overlapping periodicity. This condition may result from the other base station moving its synchronization signal transmissions to overlap with the synchronization signal transmissions of the base station 14 or by drift to the synchronization signal transmissions of one or both of the other base station or the base station 14. Other sources of interference are possible, such as Wi-Fi transmissions, transmissions from other types of networks, noise from microwave ovens, etc. Interference may be detected as a function of signal strength (e.g. RSSI), signal to noise ratio (SNR), packet error rate (PER), bit error rate (BER), or any other appropriate measure of the presence of interfering signals. RF propagation differences may arise between any two anchor channels, especially when the frequencies of the channels are relatively far apart. As a result, it is possible that a system supporting one or more spectrum bands may find different propagation performance on two or more anchor channels in the same spectrum band or the anchor channels of different spectrum bands. For example, if the network system 10 were to support operation in the spectrum bands at 2.4 GHz and at 60 GHz, it may be desirable to periodically evaluate propagation performance on the anchor channels at these bands since their respective propagation performances may be different. If interference or another condition is not detected, the transmission of synchronization signal transmissions may continue without change.

If interference or other characteristic is detected, the logical flow may proceed to block 46. In block 46, the base station 12 selects a new anchor channel configuration, based on the detection of block 44. In other words, the base station 12 selects a new anchor channel configuration, in response to or upon detecting the interference or another condition. The new anchor channel configuration may be selected according to any appropriate algorithm and may include changing one or both of the anchor channel or the timing of the transmission of the synchronization signal transmissions. Since the periodicity of the synchronization signal transmissions is likely fixed, a change in the timing the transmission of the synchronization signal transmissions may be offsetting the transmission of the synchronization signal transmissions forward or back in time by an amount that is less than the periodicity interval. For instance, the transmission of each synchronization signal transmissions may be shifted by an interval delta so as to be transmitted later than currently transmitted. Exemplary interval deltas include, but are not limited to 20 ms, 30 ms, 45 ms, etc.

Also in block 46, the new anchor channel configuration may be communicated to the electronic devices 14 serviced by the base station 12. The new anchor channel configuration may be communicated to the electronic devices 14 in one or more of a data message, in one or more control messages sent on a control signal layer, or in one or more synchronization signal transmissions such as the next synchronization signal transmission and synchronization signal transmissions that follow until the new anchor channel configuration is used. Therefore, it is possible that the new anchor channel configuration is sent multiple times and/or using multiple transmission mechanisms. Synchronization signal transmissions are not moved to the new anchor channel configuration immediately upon selection and communication of the new anchor channel configuration. Rather, synchronization signal transmissions are sent on the current anchor channel configuration for a period of time, which may be related to or linked to the periodicity of the synchronization signal transmissions. The delay in changing to the new anchor channel configuration may be fixed or variable to account for various circumstances.

In one embodiment, the base station 12 may set an anchor counter to a maximum value. The value of the anchor counter is an integer number of synchronization signal transmissions that will be transmitted on the current anchor channel configuration before switching to the new anchor channel configuration. As will be described, the anchor counter's value is communicated to the electronic device as a way of coordinating change to the new anchor channel configuration. In another embodiment, the anchor counter's value is not communicated and/or the change occurs after a predetermined number of synchronization signal transmissions. Alternatively, the change may happen after a predetermined amount of time has passed or at a specified time.

If there is no impending change to the current anchor channel configuration, the anchor counter may be set to a null value indicating no impending change in anchor channel configuration. The value of the anchor counter may be transmitted in each synchronization signal transmission so as to be communicated to the electronic devices 14. In one embodiment, the maximum value of the anchor counter is ten so that there will be ten synchronization signal transmissions transmitted on the current anchor channel configuration before switching to the new anchor channel configuration. Other maximum anchor counter values are possible.

In block 48, the next synchronization signal transmission is transmitted. The first iteration of block 48 is considered a commencing of sending a predetermined number of synchronization signal transmissions using the current anchor channel configuration. As indicated, the synchronization signal transmission is transmitted on the current anchor channel configuration with the current value of the anchor counter. Following transmission of the synchronization signal transmission, in the embodiment where the anchor counter is used the anchor counter is decremented by one in block 50. Decrementing the anchor counter in this manner counts down by one step for each transmitted synchronization period. Following the anchor counter embodiment, if a determined is made in block 52 that the anchor counter has been decremented to zero, then the logical flow may proceed to logical block 54. In other embodiments that do not rely on the anchor counter, the determination of block 52 is a check to determine if it is time to change to the new anchor channel configuration. In block 54, the new anchor channel configuration is applied so that subsequent synchronization signal transmissions are transmitted on the new anchor channel configuration selected in block 46. The logical flow then returns to routine operations in block 42.

If, in block 52, it is not time to change to the new anchor channel configuration (e.g., the anchor counter has not been decremented to zero), then the logical flow may proceed to logical block 56. In block 56, the base station 12 determines if negative feedback from one of the electronic devices 14 has been received. Negative feedback from one of the electronic devices 14 may take the form of a message transmitted from the electronic device 14 to the base station 12 and indicating that the electronic device 14 has detected interference or other condition on the new anchor channel configuration that was transmitted to the electronic device 14 in block 46. Receipt of negative feedback is an indication to the base station 12 that the anchor channel configuration selected by the base station 12 will not be suitable at the location of the electronic device 14. Therefore, under this condition, the logical flow may return to block 46 for selection of one or both of a different anchor channel or timing as a new anchor channel configuration. If negative feedback from the electronic devices 14 is not received in block 56, the logical flow may return to block 48 for transmission of the next synchronization signal transmission on the current anchor channel configuration. There may be situations where the base station 12 proceeds with the change to the new anchor channel configuration even if negative feedback is received. For instance, if the spectrum is very crowded and free anchor channel configurations are difficult to find and/or if very few electronic devices 14 report negative feedback for the new anchor channel configuration, then the change may not be aborted.

The described approach addresses potential issues that might arise if the base station 12 were to unilaterally move to a new anchor channel configuration at which there is interference or other performance affecting condition (e.g., interference to the electronic device 14 that is worse than previously experienced due to strong local interference). More specifically, the described approach avoids the need for the base station 12 to revert and fall back to another anchor channel configuration that would take time and run the risk of losing synchronization. Instead, the disclosed approach prepares in advance for a change to a new anchor channel configuration before the new anchor channel configuration is used. This is implemented by sending advance notification to the electronic devices 14 in order for the electronic devices 14 to measure spectrum conditions and to report possible issues on the new anchor channel configuration before synchronization signal transmissions are actually sent on the new anchor channel configuration. As a result, quality on the new anchor channel configuration may be verified before moving the new anchor channel configuration for sending synchronization signal transmissions. To manage the amount of time before a change in anchor channel configuration occurs, a timer or counter timer may be used. The counter may be linked to the periodicity of the synchronization signal transmissions to provide a predictable changeover point while allowing adequate time to abort the change if detections made by an electronic device 14 indicate potential issues on the new anchor channel configuration.

The foregoing approach allows for the anchor channel configuration selected by the base station 12 to be changed before the anchor channel configuration goes into effect under problematic conditions for one or more of the serviced electronic devices 14. As a result, there is less chance of losing synchronization between the base station 12 and the serviced electronic devices 14. If synchronization were lost, an interruption in one or both of the uplink (UL) or downlink (DL) data delivery may occur.

In one embodiment, to implement the foregoing approach, information elements may be added to conventional synchronization signal transmissions used in cellular systems (e.g., an LTE system) operating in licensed spectrum. For instance, a field to specify new anchor channel configuration may be added. As another example, a field to specify the anchor counter may be added (e.g., to the an SSS or other appropriate location).

Figure 4:
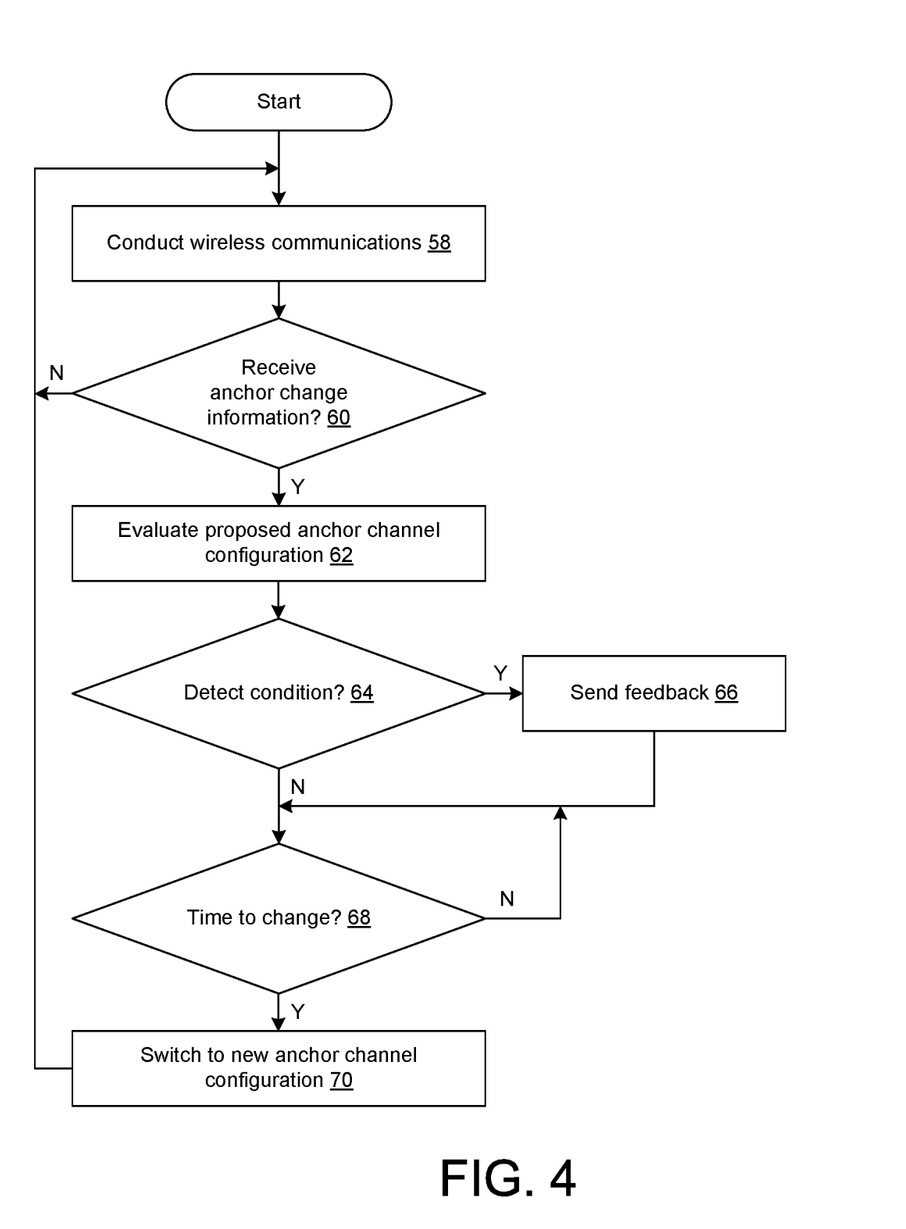
FIG. 4 is a flow-diagram of a representative method of conducting anchor channel control in an electronic device of the network system.

Referring to FIG. 4, exemplary actions carried out by the electronic device 14 are illustrated. The logical flow of conducting anchor channel control by the electronic device 14 may start in block 58. In block 58, it may be assumed that electronic device 14 is in operation and carries out wireless communications with the base station 12. In block 58, as part of carrying out wireless communications, the electronic device receives synchronization signal transmissions transmitted on the current anchor channel. In a representative embodiment, the electronic device 14 may operate in accordance with MulteFire, but other protocols are possible.

In block 60, the electronic device 60 determines if the base station 12 has transmitted new anchor channel configuration information, which would indicate an impending change to the current anchor channel configuration used by the network system 10. If new anchor channel configuration information is not received communications may continue in block 58. If new anchor channel configuration information is received in block 60, the logical flow may proceed to block 62.

In block 62, the electronic device 60 evaluates the new anchor channel configuration for a condition that would negatively affect synchronization signal operation, such as possible interference. The evaluation may be made by scanning the new anchor channel configuration, for example. As indicated, local strong interference on the new anchor channel configuration may be present that is not detected by the base station 12 when evaluating anchor channel resources to select the new anchor channel configuration. For example, interference may result from a microwave oven or a nearby Wi-Fi network (e.g., a Wi-Fi access point that is unrelated to the network system 10 may be in the process of streaming video data to a television). Interference may be measured by the electronic device 14 as a function of signal strength (e.g. RSSI), SNR, or any other appropriate measure of the presence of interfering signals. Since the electronic device 14 does not, at this time on the logical flow, use the new anchor channel configuration, evaluating PER or BER may not provide adequate results. Therefore, interference detection, as measured by the electronic device 14 or by the base station 12, should be considered as encompassing any signals, noise or error rate that may be problematic to carrying out synchronization signal operation.

In block 64, detected interference or conditions are evaluated to determine if the interference is potentially problematic. One type of potentially problematic interference may be noise with a signal strength above a predetermined threshold. Another type of potentially problematic interference may be the presence of synchronization signal transmissions from another network that have overlapping periodicity with the timing of the new anchor channel configuration. If a determination is made that a potentially problematic condition is present, then the logical flow may proceed to block 66. In block 66, the electronic device 14 transmits feedback to the base station 12. The feedback may be in the form of a data message or a control message. The feedback may be specified as a binary value (e.g., interference is detected or not detected) or may include the nature of the detected interference or condition in terms of signal strength, if a data signal is detectable, detected data signal characteristics, etc. If a potentially problematic condition is not detected, then the logical flow may proceed from block 64 to block 68. Alternatively, feedback may be transmitted even if no potentially problematic condition is detected.

Following block 66 or a negative determination in block 64, the logical flow may proceed to block 68. In block 68, the electronic device determines if it is time to change to the new anchor channel configuration (e.g., in the embodiment where the anchor counter is used, determining that it is time to change may be made if the anchor counter value in the most recent synchronization signal transmission is one). If not, the electronic device 14 will continue to receive synchronization signal transmissions on the current anchor channel configuration. If the anchor counter value in the most recent synchronization signal transmission does equal one, the logical flow may proceed to block 70. In block 70, the electronic device 14 begins to listen for synchronization signal transmissions on the new anchor channel configuration. Thereafter, the logical flow may return to block 58 or, if local interference or conditions precludes receipt of synchronization signal transmissions, the electronic device 14 may seek alternative network connectivity (e.g., on a licensed channel or on another network).

Figure 5:
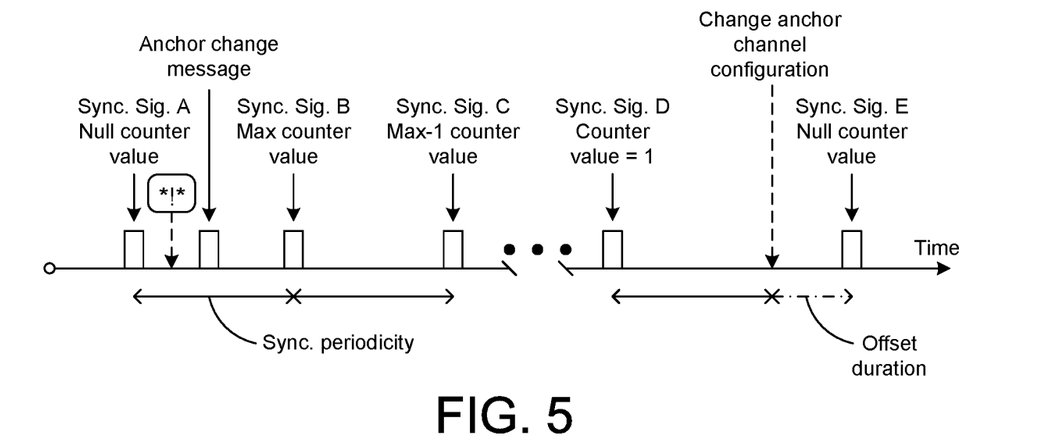
FIG. 5 is a representative timeline showing possible events that may occur in connection with the method of conducting anchor control in the network system.

With additional reference to FIG. 5, a representative timing diagram of events related to a change in anchor channel configuration is shown. FIG. 5 and its related description are purposes of setting out an example and it will be recognized that other sequences of events are possible. The timing diagram includes the transmission of a first synchronization signal transmission ("Sync. Sig. A") with a null value for the anchor counter indicating that no change to the anchor channel configuration is planned. Subsequently, at the point labeled *!*, interference is detected. In response to the detection of interference, the base station 12 selects a new anchor channel configuration and transmits information regarding the new anchor channel configuration to the electronic devices 14. Transmission of the new anchor channel configuration information is shown as being transmitted in a message dedicated for this purpose. In other embodiments, the new anchor channel configuration information is additionally or alternatively transmitted in one or more subsequent synchronization signal transmissions.

Following synchronization signal transmissions (e.g., signals "Sync. Sig. B" through "Sync. Sig. D") contain a value for the anchor counter that starts at the maximum value for the counter and decrements by one in each synchronization signal transmission until the anchor counter value equals one. At that point, the base station switches to the new anchor channel configuration. In the illustrated example, the change in anchor channel configuration is a change in the timing of the synchronization signal transmissions by shifting the signals in time by an offset duration (e.g., by shifting the transmissions according to a delay). In the illustrated example, the frequency of the anchor channel is not changed, but this is an alternative or additional possibility. Synchronization signal transmissions (e.g., "Sync. Sig. E") are then transmitted on the new anchor channel configuration.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of controlling synchronization signal operation in a base station operating in shared spectrum, comprising:

detecting a condition related to a current anchor channel configuration used for transmission of synchronization signal transmissions;

selecting, based on the detecting, a new anchor channel configuration and communicating the new anchor channel configuration to electronic devices serviced by the base station;

commencing, after the selecting, sending of a predetermined number of synchronization signal transmissions using the current anchor channel configuration; and determining if feedback is received from one of the electronic devices that the electronic device detected interference on the new anchor channel configuration and, if so, aborting a change to the new anchor channel configuration, else sending synchronization signal transmissions using the new anchor channel configuration after the predetermined number of synchronization signal transmissions has been sent on the current anchor channel configuration.

2. The method of claim 1, wherein the condition is interference.

3. The method of claim 1, wherein the predetermined number of synchronization signal transmissions is tracked with a counter of the number of transmitted synchronization signal transmissions.

4. The method of claim 3, further comprising including counter values in corresponding synchronization signal transmissions as a reference to the electronic devices as to when the synchronization signal transmissions will be transmitted on the new anchor channel configuration.

5. The method of claim 1, wherein the new anchor channel configuration has a different anchor channel frequency than the current anchor channel configuration.

6. The method of claim 1, wherein the new anchor channel configuration has a different timing of synchronization signal transmission than the current anchor channel configuration.

7. A base station that operates in shared spectrum, comprising:
a wireless interface over which wireless communications with electronic devices are carried out; and
a control circuit configured to control synchronization signal operation by the base station, including:
detect a condition related to a current anchor channel configuration used for transmission of synchronization signal transmissions;
select, based on the detection, a new anchor channel configuration and communicate the new anchor channel configuration to electronic devices serviced by the base station;
commence, after the selecting, sending of a predetermined number of synchronization signal transmissions using the current anchor channel configuration; and
determine if feedback is received from one of the electronic devices that the electronic device detected interference on the new anchor channel configuration and, if so, abort a change to the new anchor channel configuration, else one of: send synchronization signal transmissions using the new anchor channel configuration after the predetermined number of synchronization signal transmissions has been sent on the current anchor channel configuration.

8. The base station of claim 7, wherein the condition is interference.

9. The base station of claim 7, wherein the predetermined number of synchronization signal transmissions is tracked with a counter of the number of transmitted synchronization signal transmissions.

10. The base station of claim 9, wherein counter values are included in corresponding synchronization signal transmissions as a reference to the electronic devices as to when the synchronization signal transmissions will be transmitted on the new anchor channel configuration.

11. The base station of claim 7, wherein the new anchor channel configuration has a different anchor channel frequency than the current anchor channel configuration.

12. The base station of claim 7, wherein the new anchor channel configuration has a different timing of synchronization signal transmission than the current anchor channel configuration.

13. A method of controlling synchronization signal transmission handling in an electronic device operating in shared spectrum and serviced by a base station, comprising:
receiving notification indicative of a new anchor channel configuration from the base station and, subsequently, receiving a predetermined number of synchronization signal transmissions using a current anchor channel configuration from the base station;
evaluating the new anchor channel configuration for a condition related to the new anchor channel configuration;
upon the condition being detected, wherein the condition is interference, transmitting feedback to the base station regarding the detected interference; and
following the receipt of the notification of the new anchor channel configuration and, if a time arrives to switch from a current anchor channel configuration to the new anchor channel configuration, switching from current anchor channel configuration to the new anchor channel configuration; and
wherein determining if a time arrives to switch from the current anchor channel configuration to the new anchor channel configuration includes monitoring a value in received synchronization signal transmissions to determine if the monitored value reaches a predetermined value; and
wherein the monitored value is a counter reflecting the number of synchronization signal transmissions sent since the notification of the new anchor channel configuration.

14. The method of claim 13, further comprising evaluating the detected interference for potential to disrupt receipt of synchronization signal transmissions on the new anchor channel configuration.

15. The method of claim 13, wherein the new anchor channel configuration has a different anchor channel frequency than the current anchor channel configuration.

16. The method of claim 13, wherein the new anchor channel configuration has a different timing of synchronization signal transmission than the current anchor channel configuration.

* * * * *